US00RE39964E

(19) United States
(12) Reissued Patent
Burek et al.

(10) Patent Number: US RE39,964 E
(45) Date of Reissued Patent: Jan. 1, 2008

(54) HELMET

(75) Inventors: Roy Burek, Chester (GB); Geoffrey King, Chester (GB)

(73) Assignee: Charles Owen & Co. (Bow) Limited, Wrexham (GB)

(21) Appl. No.: 11/203,650

(22) Filed: Aug. 12, 2005

Related U.S. Patent Documents

Reissue of:
(64) Patent No.: 6,735,786
Issued: May 18, 2004
Appl. No.: 10/074,767
Filed: Feb. 11, 2002

(30) Foreign Application Priority Data

Feb. 13, 2001 (GB) ..... 0103600

(51) Int. Cl.
*A42B 7/00* (2006.01)

(52) U.S. Cl. ..... 2/421; 2/909
(58) Field of Classification Search ..... 2/421, 2/410, 414, 909
See application file for complete search history.

(56) References Cited

U.S. PATENT DOCUMENTS

| | | | | |
|---|---|---|---|---|
| 2,846,683 | A | 8/1958 | Dye et al. | 2/421 |
| 3,582,990 | A | 6/1971 | Frieder | |
| 4,044,399 | A | 8/1977 | Morton | |
| 4,599,752 | A | 7/1986 | Mitchell | |
| 5,044,016 | A | 9/1991 | Coombs | 2/414 |
| 5,896,587 | A | 4/1999 | Gentry | 2/425 |
| 6,735,786 | B2 * | 5/2004 | Roy et al. | 2/421 |
| 2002/0108168 | A1 * | 8/2002 | Roy et al. | 2/411 |
| 2004/0045078 | A1 * | 3/2004 | Puchalski | 2/411 |

FOREIGN PATENT DOCUMENTS

| | | | |
|---|---|---|---|
| DE | 29709186 | U1 | 9/1998 |
| DE | 29709486 | U1 * | 9/1998 |
| DE | 297 09 186 | U1 | 11/1998 |
| EP | 0 077 015 | B1 | 4/1983 |
| EP | 77015 | A2 * | 4/1983 |
| EP | 0 194 324 | A1 | 9/1986 |
| EP | 194324 | A1 * | 9/1986 |
| EP | 0 217 996 | B1 | 4/1987 |
| GB | 249725 | | 4/1926 |
| GB | 250418 | | 4/1926 |
| GB | 735389 | | 8/1955 |
| GB | 801321 | | 9/1958 |
| GB | 1 553 936 | | 10/1979 |
| GB | 1 569 050 | A | 6/1980 |
| GB | 1569050 | A * | 6/1980 |
| GB | 2 201 330 | A | 9/1988 |
| GB | 2 371 970 | B | 8/2002 |
| JP | 06057509 | A | 3/1994 |
| JP | 06-057509 | | 3/1994 |
| JP | 060057509 | A * | 3/1994 |
| JP | 08-041712 | | 2/1996 |
| JP | 08-041723 | | 2/1996 |
| JP | 08041723 | A | 2/1996 |
| JP | 080041723 | A * | 2/1996 |
| WO | WO 97137553 | A1 * | 10/1997 |

* cited by examiner

*Primary Examiner*—Rodney M. Lindsey
(74) *Attorney, Agent, or Firm*—Woodard, Emhardt, Moriarty, McNett & Henry LLP

(57) ABSTRACT

A helmet having an outer shell defining an inwardly facing surface extending to an edge of the shell, and a lining defining an outer surface facing the inwardly facing surface of the shell, an inner surface which in use faces the head of a person wearing the helmet, and an edge surface extending between the inner and outer surfaces of the lining adjacent the edge of the shell. A strap is secured to the outer shell and extends from between the inwardly facing surface of the outer shell and the outer surface of the lining. Means such as a hook and loop fastening are provided for releasably attaching a portion of the strap immediately adjacent the lining to the edge surface of the lining, such that the strap adjacent the shell edge is pulled towards the head of the wearer.

8 Claims, 2 Drawing Sheets

HELMET

Matter enclosed in heavy brackets [ ] appears in the original patent but forms no part of this reissue specification; matter printed in italics indicates the additions made by reissue.

This invention relates to helmets.

Riding helmets have long been employed to prevent or reduce head injuries to horse riders. Riding helmets typically comprise a hard outer shell that provides structural stability and resistance to physical impact, and a softer lining. This lining makes the helmet more comfortable for the wearer, whilst also cushioning the wearer against impacts to the outer shell of the helmet.

Riding helmets are normally fitted with a fastening strap that holds the helmet in place upon the head of the wearer, preventing the helmet being accidentally dislodged. These straps pass between points of attachment on the helmet and under the chin of the wearer.

In order that the strap may be stably secured to the helmet it is normal for the strap to be anchored to the hard outer shell, since this is the part of the helmet most able to resist deformation.

Given that the outer shell is spaced from the side of the wearer's head by the thickness of the lining, if the strap is simply secured to the inner surface of the outer shell by, for example, a rivet the strap cannot lie flat against the wearer's head adjacent the lower edge of the helmet lining. Thus a triangular space is defined beneath the lower edge of the lining, the side of the wearer's head and the strap. This represents a hazard as a tree branch, for example, could become hooked beneath the strap if by chance the branch passed through the triangular space. If a tree branch did become hooked beneath the strap the wearer would be exposed to the risk of severe injury.

The above problem has been appreciated in the past and has been addressed by producing helmets in which the straps extend from their points of attachment on the outer shell and through the lining such that the strap extends around the wearer's head from the inner side of the lower edge of the lining. The strap then lies flat adjacent the wearer's head, reducing the risk of the strap becoming hooked on, for example, a tree branch.

Unfortunately, such an arrangement is relatively complicated and is difficult to manufacture, as the strap cannot be attached to the outer shell before addition of the lining.

According to the present invention there is provided a helmet having an outer shell defining an inwardly facing surface extending to an edge of the shell, a lining defining an outer surface facing the inwardly facing surface of the shell, an inner surface which in use faces the head of a person wearing the helmet, and an edge surface extending between the inner and outer surfaces of the lining adjacent the edge of the shell, a strap secured to the outer shell and extending from between the inwardly facing surface of the outer shell and the outer surface of the lining, and means for releasably attaching a portion of the strap immediately adjacent the lining to the edge surface of the lining, such that the strap adjacent the shell edge is pulled towards the head of the wearer.

A helmet according to the invention confers upon its wearer the advantage that it greatly reduces the risk of the strap becoming snagged on passing obstacles. Thus there is a reduced risk of injury to the rider. This advantage arises because the profile of the strap is induced to conform better to the shape of the wearer's face. As a result of this the gap between the wearer's face and the strap is reduced and hence there is a smaller area into which objects may become inserted and entangled.

Suitable means for attaching the strap to the edge surface of the lining according to the invention include fastenings such as hook and loop fastenings and press-stud fastenings. The use of releasable attaching means ensures that, should the strap become entangled with another object, and cause the detachment of the strap from the lining of the helmet, the strap may simply be brought back into engagement with the lining without requiring repair of the helmet.

The outer shell and lining of the helmet may cover the entire outer surface of the lining, or alternatively the shell and lining may be somewhat differently sized. For example the lining of the helmet may protrude from beneath the outer shell by a distance of approximately 30 mm.

The invention will now be described by way of example with reference to the accompanying drawings in which.

Figure 1:
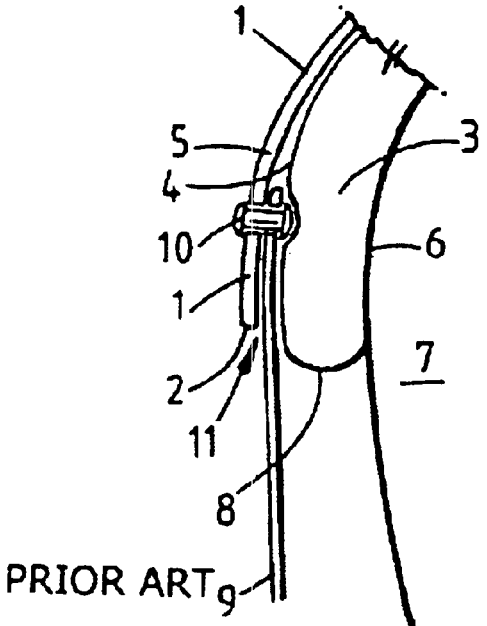
FIG. 1 represents a known helmet with the strap unfastened.

Turning to FIG. 1, the helmet comprises a hard outer shell 1, which is bounded by a beaded edge 2. A lining 3 is received within the shell 1, such that an outer surface 4 of the lining 3 faces an inner surface 5 of the outer shell 1. An inner surface 6 of the lining 3 is in contact with the head of a wearer 7. An edge surface 8 extends between the inner and outer surfaces of the lining (6 and 4 respectively). A helmet strap 9 is secured to the outer shell 1 by a rivet 10, which passes through both outer shell 1 and strap 9. The strap 9 is positioned between the inner surface 5 of the outer shell 1 and the outer surface 4 of the lining 3. When the strap is unfastened it depends freely from a gap 11 between the outer shell 1 and the lining 3.

Figure 2:
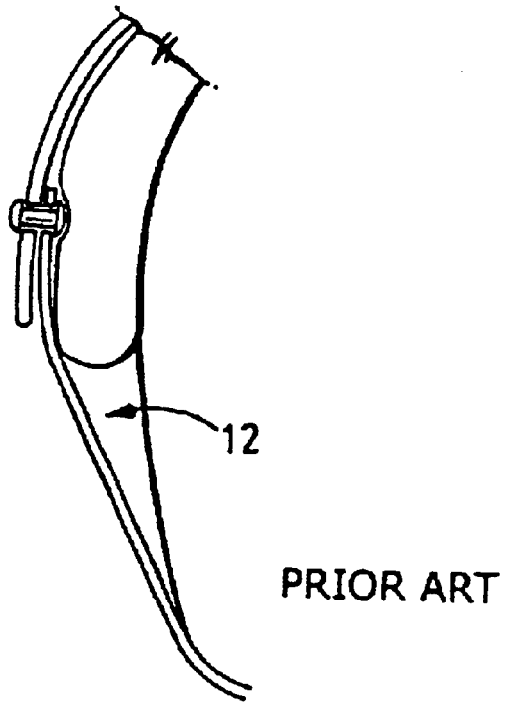
FIG. 2 represents the helmet of FIG. 1 with the strap fastened.

In FIG. 2 it can be seen that when the strap 9 is fastened so that it passes beneath the chin of the wearer 7 its profile relative to the head of the wearer 7 is such that it creates a generally triangular space 12 between the strap and the wearer's head. This space 12 represents a potential hazard as the branches of trees for instance may pass through the space 12 to become hooked on the strap 9.

Figure 3:
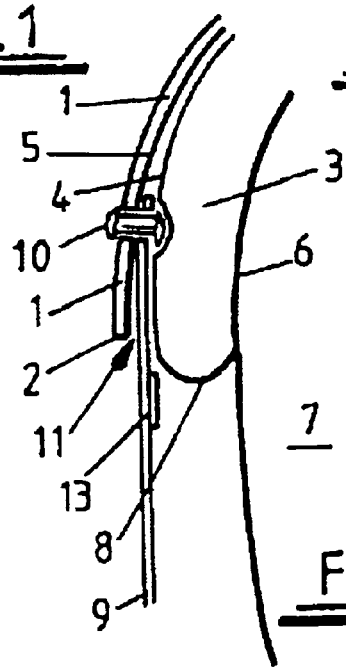
FIG. 3 represents a helmet according to the present invention with the strap unfastened.

FIG. 3 illustrates a helmet according to the invention, which differs from the helmet of FIG. 1 in the provision of a portion of a hook and loop type fastening 13 which is attached to the strap 9 adjacent the edge surface 8 of the lining 3, the edge surface 8 of the lining defining loops with which hooks on the fastening may engage.

Figure 4:
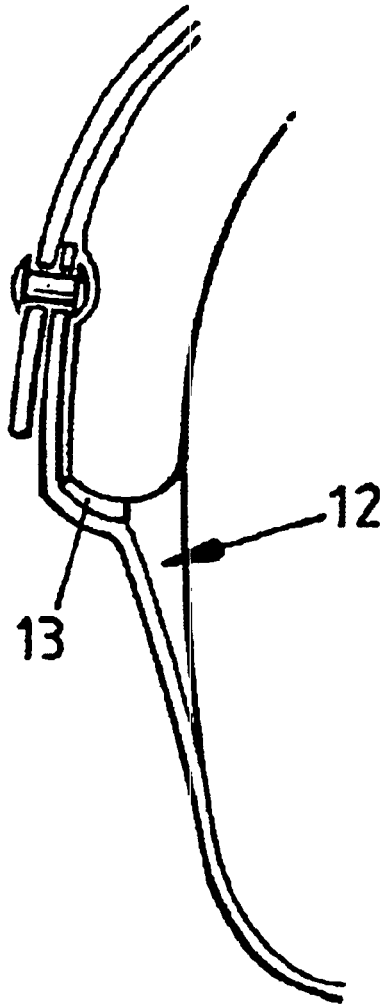
FIG. 4 represents the helmet of FIG. 3 with the strap fastened.

In FIG. 4 the helmet of FIG. 3 is shown in use with the strap 9 fastened around the head of the wearer 7. The fastener portion 13 is engaged with the edge surface 8 of the lining 3 inducing the strap 9 to conform more closely to the profile of the wearer's head 7. This greatly reduces the size of the space 12 formed between the strap 9 and the wearer 7, which thereby provides a much smaller area into which hazards may be inserted.

In the illustrated embodiment of the invention the surface 8 of the lining 3 is defined by a loop-defining material. Alternative releasable arrangements are possible, for example a strap of loop-defining material could be provided on the lining surface adjacent the strap 9, or a press stud could be provided to secure the strap 9 to the lining 3. It is also contemplated that a suitable attachment may be provided by glue, the properties of which have been selected such that the glue will allow the strap 9 to separate from the lining 3 if pulled hard.

Figure 5:
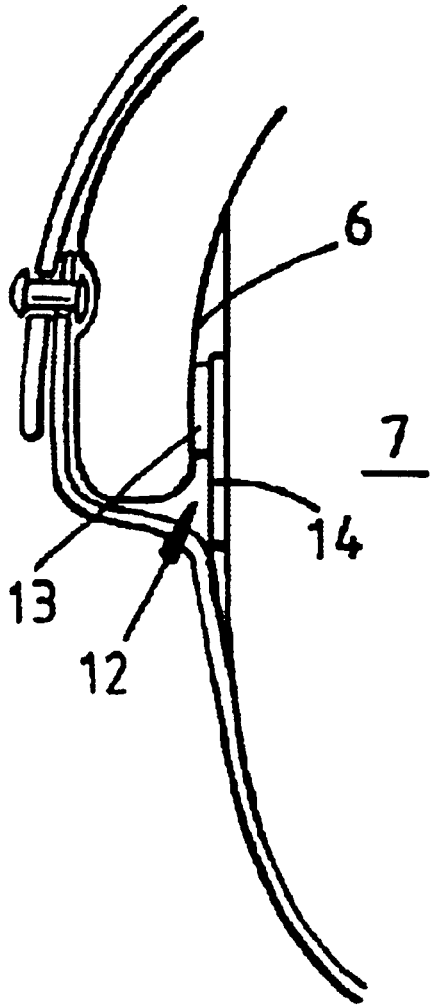
FIG. 5 represents a helmet according to a second embodiment of the invention, with the strap fastened.

In the embodiment of the invention depicted in FIG. 5, a facing 14 is provided which extends from the strap 9. In use this facing 14 extends between the strap 9 and the head 7 of the wearer, and the inner surface 6 of the lining 3 and the head 7 of the wearer. The facing is attached to the inner surface 6 of the lining 3 by a fastener portion 13, (e.g. hook and loop or glue) causing the strap 9 to conform to the profile of the wearer's head 7, thereby reducing the size of the space 12.

What is claimed is:

1. A helmet having an outer shell defining an inwardly facing surface extending to an edge of the shell, a lining defining an outer surface facing the inwardly facing surface of the shell, an inner surface which in use faces the head of a person wearing the helmet, and an edge surface extending between the inner and outer surfaces of the lining adjacent the edge of the shell, a strap secured to the outer shell and extending from between the inwardly facing surface of the outer shell and the outer surface of the lining, means for releasably attaching a portion of the strap [immediately adjacent the lining] to [the edge surface of] the lining, such that *a portion of* the strap adjacent the shell edge is pulled towards the head of the wearer.

2. A helmet as claimed in claim 1, wherein the attaching means comprise a hook and loop fastening.

3. A helmet as claimed in claim 1, wherein the attaching means comprise a press-stud fastening.

4. A helmet as claimed in claim 1, wherein the attaching means comprise glue.

5. A helmet as claimed in claim 1, wherein the strap is provided with a facing that attaches to the inner surface of the lining.

*6. A helmet as claimed in claim 1, wherein said means for releasably attaching said portion of the strap includes releasably attaching a portion of the strap immediately adjacent the lining to the edge surface of the lining, such that a portion of the strap adjacent the shell edge is pulled towards the head of the wearer.*

*7. A helmet having an outer shell defining an inwardly facing surface extending to an edge of the shell, a lining defining an outer surface facing the inwardly facing surface of the shell, an inner surface which in use faces the head of a person wearing the helmet, and an edge surface extending between the inner and outer surfaces of the lining adjacent the edge of the shell, a strap secured to the outer shell and extending from between the inwardly facing surface of the outer shell and the outer surface of the lining, a fastener for releasably attaching a portion of the strap to the lining, such that a portion of the strap adjacent the shell edge is pulled towards the head of the wearer.*

*8. A helmet as claimed in claim 7, wherein said fastener releasably attaches a portion of the strap immediately adjacent the lining to the edge surface of the lining, such that a portion of the strap adjacent the shell edge is pulled towards the head of the wearer.*

* * * * *